United States Patent
Menge

(10) Patent No.: US 7,829,857 B2
(45) Date of Patent: Nov. 9, 2010

(54) RADIATION DETECTOR DEVICE

(76) Inventor: Peter R. Menge, 472 Greenhaven Dr., Chagrin Falls, OH (US) 44022

( * ) Notice: Subject to any disclaimer, the term of this patent is extended or adjusted under 35 U.S.C. 154(b) by 76 days.

(21) Appl. No.: 12/104,794

(22) Filed: Apr. 17, 2008

(65) Prior Publication Data

US 2009/0261257 A1    Oct. 22, 2009

(51) Int. Cl.
 *G01T 1/20* (2006.01)
(52) U.S. Cl. .................. 250/368; 250/369; 250/370.11
(58) Field of Classification Search .................. 250/368, 250/369, 370.11
See application file for complete search history.

(56) References Cited

U.S. PATENT DOCUMENTS

| | | |
|---|---|---|
| 4,158,773 A | 6/1979 | Novak |
| 4,360,733 A | 11/1982 | Novak et al. |
| 4,383,175 A | 5/1983 | Toepke |
| 4,694,170 A | 9/1987 | Slodzian et al. |
| 4,764,677 A | 8/1988 | Spurney |
| 4,994,673 A | 2/1991 | Perna et al. |
| 5,087,818 A | 2/1992 | Bellian et al. |
| 5,283,439 A | 2/1994 | Bouissou et al. |
| 5,406,078 A | 4/1995 | Jacobson |
| 5,742,057 A | 4/1998 | Frederick et al. |
| 5,753,918 A | 5/1998 | Pandelisev |
| 5,869,836 A | 2/1999 | Linden et al. |
| 6,149,748 A | 11/2000 | Boedinger et al. |
| 6,222,192 B1 | 4/2001 | Sekela et al. |
| 6,297,507 B1 | 10/2001 | Chen et al. |
| 6,359,282 B1 | 3/2002 | Sekela |
| 6,373,066 B1 | 4/2002 | Penn |
| 6,433,340 B1 | 8/2002 | Penn |
| 6,624,420 B1 | 9/2003 | Chai et al. |
| 6,657,201 B2 | 12/2003 | DeJule |
| 6,781,134 B1 | 8/2004 | Murray et al. |
| 6,844,419 B2 | 1/2005 | Raghavan et al. |
| 7,034,305 B2 | 4/2006 | Frederick et al. |
| 7,054,408 B2 | 5/2006 | Jiang |
| 7,151,261 B2 | 12/2006 | Chai |
| 7,224,766 B2 | 5/2007 | Jiang |
| 2005/0045821 A1 | 3/2005 | Noji et al. |
| 2005/0184241 A1 | 8/2005 | Clarke et al. |
| 2005/0253072 A1 | 11/2005 | Chai |
| 2006/0027742 A1 | 2/2006 | Srivastava et al. |
| 2006/0091312 A1 | 5/2006 | Saenger |

(Continued)

OTHER PUBLICATIONS zircarzirconia.com, "Alumina Fibers and Textiles, Type AL," Product Data, Bulletin #E-01, Jan. 2004, pp. 1-3.

(Continued)

*Primary Examiner*—David P Porta
*Assistant Examiner*—Mindy Vu
(74) *Attorney, Agent, or Firm*—Larson Newman & Abel, LLP

(57) ABSTRACT

A radiation detector device is disclosed that includes a photosensor and a scintillator coupled to the photosensor. The scintillator includes a scintillator crystal having a first end proximal to the photosensor, a second end distal from the photosensor, and a length extending between the proximal end and the distal end. The scintillator also includes a reflector substantially surrounding the scintillator crystal at least along its length. The reflector comprises a fabric that includes a plurality of fibers, each fiber comprising an inorganic material.

16 Claims, 5 Drawing Sheets

U.S. PATENT DOCUMENTS

| | | |
|---|---|---|
| 2006/0102834 A1 | 5/2006 | Mickael |
| 2007/0007460 A1 | 1/2007 | Hochstetler et al. |
| 2007/0036887 A1* | 2/2007 | Haase et al. .................. 427/64 |
| 2007/0209581 A1 | 9/2007 | Ferrand et al. |
| 2008/0261012 A1* | 10/2008 | Kopf et al. .................. 428/222 |
| 2009/0101816 A1 | 4/2009 | Noji et al. |
| 2009/0102733 A1* | 4/2009 | Kanne et al. ................ 343/757 |

OTHER PUBLICATIONS

Rozsa, C.M., et al., "Characteristics of Scintillators for Well Logging to 225C," Bicron Corporation, Newbury, OH 44065, 1989, 12 pgs.

Rozsa, C., et al., "Stability of Bircon's Standard Logging Detectors," 3 pgs.

U.S. Appl. No. 12/106,011, filed Apr. 18, 2008, Peter R. Menge et al.

U.S. Appl. No. 12/058,409, filed Mar. 28, 2008, Peter R. Menge et al.

U.S. Appl. No. 11/689,404, filed Mar. 21, 2007, Peter R. Menge et al.

* cited by examiner

RADIATION DETECTOR DEVICE

FIELD OF THE DISCLOSURE

The present disclosure is directed to radiation detector devices, particularly ruggedized scintillator devices for industrial applications.

BACKGROUND

Radiation detector devices are used in a variety of industrial applications. For example, scintillation detectors are used for well logging in the oil and gas industry. Typically, scintillation detectors have scintillator crystals made of an activated sodium iodide or other material that is effective for detecting gamma rays. Generally, the scintillator crystals are enclosed in casings or sleeves that include a window to permit radiation-induced scintillation light to pass out of the crystal package. The light passes to a light-sensing device such as a photomultiplier tube, and the photomultiplier tube converts the light photons emitted from the crystal into electrical pulses. The electrical pulses are shaped and digitized by associated electronics and may be registered as counts that are transmitted to analyzing equipment.

Scintillation detectors are useful for well logging, because the measurement of radiation, such as gamma rays and neutrons, allows users to analyze rock strata that surround a bore hole. Scintillation detectors can be used in drilling apparatuses themselves, giving rise to the common practice of measurement while drilling (MWD) (or logging while drilling). Nonetheless, MWD applications often take place in severe environments characterized by large amounts of heat, vibration and shock, which impact detector durability and accuracy.

Accordingly, the industry continues to need improvements in radiation detector devices, particularly durable, ruggedized scintillation detectors that can withstand the harsh environments of industrial applications.

SUMMARY

A radiation detector device is disclosed that includes a photosensor and a scintillator coupled to the photosensor. The scintillator includes a scintillator crystal having a first end proximal to the photosensor, a second end distal from the photosensor, and a length extending between the proximal end and the distal end. The scintillator also includes a reflector substantially surrounding the scintillator crystal at least along its length. The reflector comprises a fabric that includes a plurality of fibers, each fiber comprising an inorganic material.

In another embodiment, a radiation detector device is disclosed that includes a photosensor coupled to a scintillator. The radiation detector device also includes at least one electronic device communicating with the photosensor. The at least one electronic device is adapted to receive electrical pulses from the photosensor and to count photons emitted by the scintillator based on a pulse height of each electrical pulse received from the photosensor. The radiation detector device is characterized by a thermal degradation factor at 200° C. that is less than or equal to approximately ten percent (10%). The thermal degradation factor at 200° C. is defined as a difference between: (i) a first pulse height of a first electrical pulse associated with a number of photons emitted by the scintillator at room temperature prior to exposure of the radiation detector device to a temperature greater than 50° C., and (ii) a second pulse height of a second electrical pulse associated with the number of photons emitted by the scintillator at room temperature after exposure of the radiation detector device to a temperature of 200° C. for twenty-four hours.

In another embodiment, a scintillator is disclosed that includes a scintillator crystal. The scintillator crystal having a length extending between a first end and a second end. The scintillator also includes a reflector substantially surrounding the scintillator crystal at least along its length. The reflector comprises a fabric that includes a plurality of fibers, each fiber comprising an inorganic material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed articles, systems or methods. Moreover, some statements may apply to some inventive features but not to others.

Figure 1:
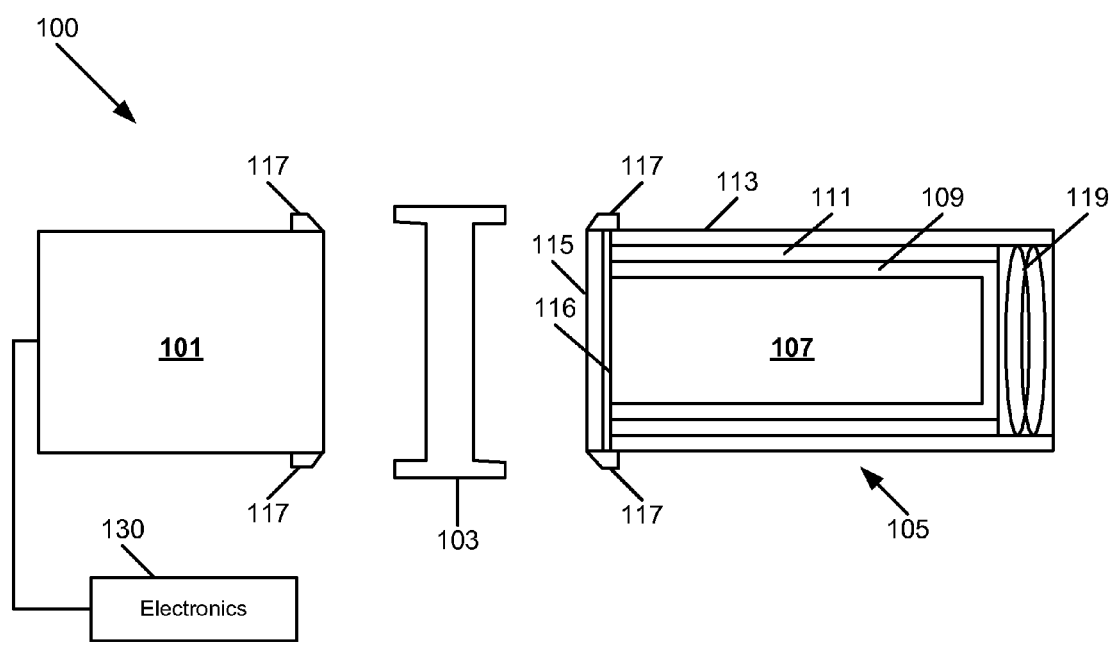
FIG. 1 is an illustration of a particular embodiment of a radiation detector device.

FIG. 1 shows a particular embodiment of a radiation detector device. The radiation detector device 100 includes a photosensor 101, a light pipe 103, and a scintillator 105. Though the photosensor 101, the light pipe 103, and the scintillator 105 are illustrated separate from each other, it is to be understood that the photosensor 101 and the scintillator 105 are adapted to be coupled to each other via the light pipe 103. In one embodiment, the scintillator 105 and the photosensor 101 can be coupled to the light pipe 103 using biasing members 117. The biasing members 117 can provide a resiliency that facilitates the absorption of shocks to the detector 100. The biasing members 117 can be used in conjunction with other known coupling methods such as the use of an optical gel or bonding agent. Further, the photosensor 101 communicates with electronics 130 adapted to count photons received at the photosensor 101 based on electrical pulses output by the photosensor 101. The electronics 130 can include one or more electronic devices, such as an amplifier, a pre-amplifier, a discriminator, an analog-to-digital signal converter, a photon counter, another electronic device, or any combination thereof.

In one embodiment, the photosensor 101 includes a device capable of spectral detection and resolution. For example, the photosensor 101 can comprise a conventional photomultiplier tube (PMT) or a hybrid photosensor. The photosensor 101 is adapted to receive photons emitted by the scintillation device 105, other sources, or a combination thereof, and the photosensor 101 produces electrical pulses from photons that it receives. The electrical pulses can be shaped and digitized by associated electronics 130 to provide a count of the photons received at the photosensor 101. The photosensor 101 can be housed within a tube or housing made of a material capable of protecting electronics associated with the photosensor 101, such as a metal, metal alloy, other material, or any combination thereof.

As illustrated, the light pipe 103 is disposed between the photosensor 101 and the scintillator 105 and facilitates optical coupling between the photosensor 101 and the scintillator 105. In one embodiment, the light pipe 103 can include a quartz light pipe, plastic light pipe, or another light pipe. In another embodiment, the light pipe 103 can comprise a silicone rubber interface that optically couples an output window 115 of the scintillator 105 with an input window of the photosensor 101. In some embodiments, multiple light pipes can be disposed between the photosensor 101 and the scintillator 105.

The scintillator 105 includes a scintillator crystal 107 housed within a casing 113. The scintillator crystal 107 has a length that extends from a first end that is proximal to the photosensor 101 and a second end that is distal from the photosensor 101. The casing 113 includes an output window 115 that is interfaced to the first end of the scintillator crystal 107. The output window 115 can include glass or another transparent or translucent material suitable to allow photons emitted by the scintillator crystal 107 to pass from the scintillator 105 toward the photosensor 101. An optical interface 116 is disposed between the scintillator crystal 107 and the output window 115. The optical interface 116 can comprise clear silicone rubber. In one embodiment, the optical interface is polarized to optically couple the scintillator crystal 107 to the output window 115 by aligning the reflective indices of the scintillator crystal 107 and the output window 115.

The scintillator 105 also includes a reflector 109. In one embodiment, the casing 113 can include a shock-absorbing member 111 disposed between the casing 113 and the reflector 109 along the length of the scintillator crystal 107. The casing 113 can also include a spring 119, or other stabilization mechanism, interfaced to the second end of the scintillator crystal 107 that is distal from the photosensor 101.

The reflector 109 comprises a single-layer or multi-layer fabric. The reflector 109 substantially surrounds the scintillator crystal 107, at least along its length. In a particular embodiment, the reflector 109 can also substantially surround the second end of the scintillator crystal 107 that is distal from the photosensor 101. In a particular embodiment, the reflector 109 can form a continuous sleeve or pocket that envelops the scintillator crystal 107. In another embodiment, the scintillator crystal 107 can be wrapped in the fabric.

Each layer of fabric included in the reflector 109 has a plurality of fibers. The fibers each comprise an inorganic material, such as a ceramic material. For example, the fibers can each comprise a refractory material, such as a refractory oxide material, a refractory non-oxide material (e.g., a refractory nitride or carbide material), or a refractory composite material. In one embodiment, the fibers include a plurality of alumina fibers, a plurality of silica fibers, a plurality of borosilicate fibers, or any combination thereof. In an illustrative embodiment, alumina fibers can include sapphire fibers, and silica fibers can include quartz fibers.

The fabric included in the reflector 109 comprises at least one layer of woven fabric, at least one layer of non-woven fabric (e.g., felt), or any combination thereof. For instance, a quartz or sapphire felt can include pressed fibers surrounding a base fabric of woven quartz or sapphire cloth. A total thickness of the layer(s) of fabric included in the reflector 109 is preferably from approximately 0.1 mm to approximately 10 mm, or, more preferably, from approximately 0.2 mm to approximately 5 mm, such as approximately 1 mm to approximately 4 mm.

The fabric included in the reflector 109 can include particles of a material that has greater reflectivity than the material included in the fibers. For example, particles of a polymeric material can be disposed between the fibers of the fabric. In one embodiment, particles of a fluoropolymer, such as polytetrafluoroethylene (PTFE) particles, can be disposed in gaps between fibers in a woven fabric. In another example, particles of the more reflective material can be disposed in pores between fibers in a felt or other non-woven fabric.

The particles can be included in a fabric through various processes, including (without limitation) dry powder processes (e.g., electrostatic application of a PTFE powder followed by curing under heat); powder slurry processes (e.g., mixing the particles in water and straining through the fabric); soft grinding (e.g., rubbing the particles into the fabric by hand); vacuum bead-blasting processes; one or more other processes; or any combination thereof. The particles of more reflective material are preferably characterized by a particle size of from approximately 0.1 μm to approximately 20 μm, or more preferably, a particle size of from approximately 1 μm to approximately 10 μm. Most preferably, the particles are characterized by a particle size of from approximately 1 μm to approximately 5 μm.

In one embodiment, the electronics 130 are adapted to receive electrical pulses from the photosensor 101 and to count photons emitted by the scintillator 105 based on a pulse height of each electrical pulse received from the photosensor 101. Certain temperatures can cause conventional radiation detector devices to emit electrical pulses having varying pulse heights for identical numbers of photons. This variation can be expressed as a thermal degradation factor (TDF) that references a certain temperature. For example, a thermal degradation factor at 200° C. can be defined as a difference between: (i) a first pulse height of a first electrical pulse associated with a number of photons emitted by the scintillator at room temperature, prior to exposure of the radiation detector device to a temperature greater than 50° C., and (ii) a second pulse height of a second electrical pulse associated with photons emitted by the scintillator at room temperature, after exposure of the radiation detector device to a temperature of 200° C. for twenty-four hours.

In another example, a thermal degradation factor at 250° C. can be defined as a difference between: (i) a first pulse height of a first electrical pulse associated with a number of photons emitted by the scintillator at room temperature, prior to exposure of the radiation detector device to a temperature greater than 50° C., and (ii) a second pulse height of a second electrical pulse associated with photons emitted by the scintillator at room temperature, after exposure of the radiation detector device to a temperature of 250° C. for twenty-four hours.

The radiation detector device 100 illustrated in FIG. 1 is characterized by a thermal degradation factor at 200° C. that is less than or equal to approximately ten percent (10%). For example, based on the composition of the reflector 109, the thermal degradation factor at 200° C. can be less than or equal to approximately eight percent (8%); less than or equal to approximately five percent (5%); less than or equal to approximately three percent (3%); or less than or equal to approximately one percent (1%). As discussed herein, the radiation detector device 100 can be characterized by a thermal degradation factor at 250° C. that is less than or equal to approximately ten percent (10%); such as less than or equal to approximately eight percent (8%); less than or equal to approximately five percent (5%); less than or equal to approximately three percent (3%); or less than or equal to approximately one percent (1%).

Figure 2:
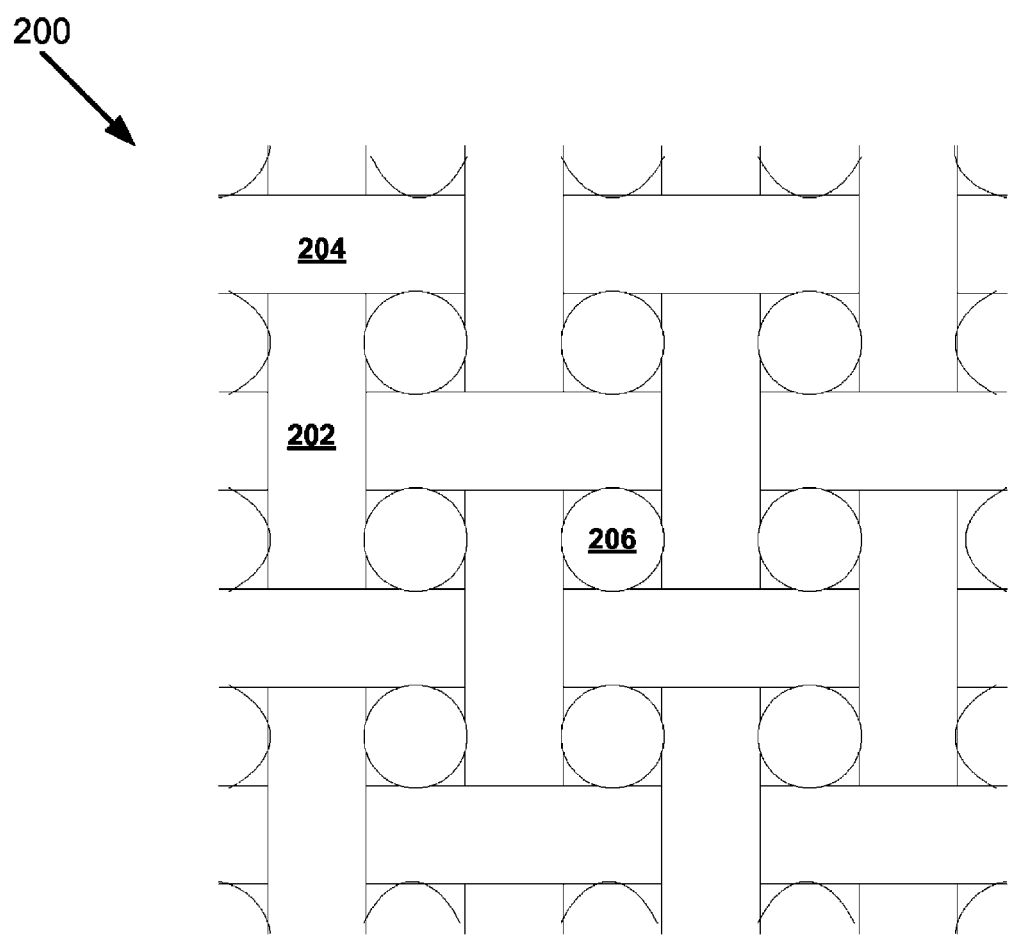
FIG. 2 is a general diagram of a particular embodiment of a layer of woven reflector fabric.

FIG. 2 illustrates a top view of a portion of a layer of woven reflector fabric 200. The fabric 200 includes a plurality of warp fibers 202 and at least one weft fiber 204. The warp fibers 202 are substantially parallel to one another, and substantially perpendicular to the weft fiber(s) 204. In some embodiments, the fabric 200 can include a single weft fiber 204 that is woven under and over a plurality of warp fibers 202. In other embodiments, multiple weft fibers can be woven under and over the plurality of warp fibers 202.

Each of the warp fibers 202 and the weft fiber(s) 204 comprises an inorganic material, such as a ceramic material. For example, the fibers can each comprise a refractory material, such as a refractory oxide material, refractory non-oxide material, or refractory composite material. In one embodiment, each fiber comprises alumina, silica, borosilicate or any combination thereof. For example, some alumina fibers may contain small amounts of silica (e.g., less than 5%). Alumina fibers can include sapphire fibers, and silica fibers can include quartz fibers.

In the embodiment shown in FIG. 2, the fabric 200 includes a plurality of particles 206 disposed between its fibers 202, 204. Each of the particles 206 comprises a more reflective material than that of the fibers 202, 204. The particles 206 can comprise a reflective polymeric material. For example, the particles 206 can comprise a fluoropolymer material, such as polytetrafluoroethylene (PTFE). Each particle 206 can be disposed in a gap between two warp fibers 202 and one or more weft fibers 204. At an edge or corner of the fabric 200, a particle 206 can be disposed between fewer than two warp fibers, fewer than two weft fibers, or a combination thereof. If the fabric 200 includes multiple layers, a particle 206 can be disposed between more than two warp fibers, more than one weft fibers, or a combination thereof.

The warp fibers 202 and the weft fiber(s) 204 are characterized by an average fiber diameter of less than approximately 30 µm, preferably from approximately 0.5 µm to approximately 20 µm. Most preferably, the fibers 202, 204 are characterized by an average fiber diameter of approximately 1 µm to approximately 15 µm, such as from approximately 5 µm to approximately 10 µm. The particles 206 are preferably characterized by a particle size of from approximately 0.1 µm to approximately 20 µm, or more preferably, a particle size of from approximately 1 µm to approximately 10 µm. Most preferably, the particles are characterized by a particle size of from approximately 1 µm to approximately 5 µm. While FIG. 2 illustrates a single layer of woven reflector fabric, a reflector, such as the reflector 109 illustrated in FIG. 1, can include multiple layers of woven fabric. A total thickness of the layer(s) of fabric can range from 0.1 mm to 10 mm, and is preferably from approximately 0.2 mm to approximately 5 mm. More preferably, the total thickness is from approximately 1 mm to approximately 4 mm.

Figure 3:
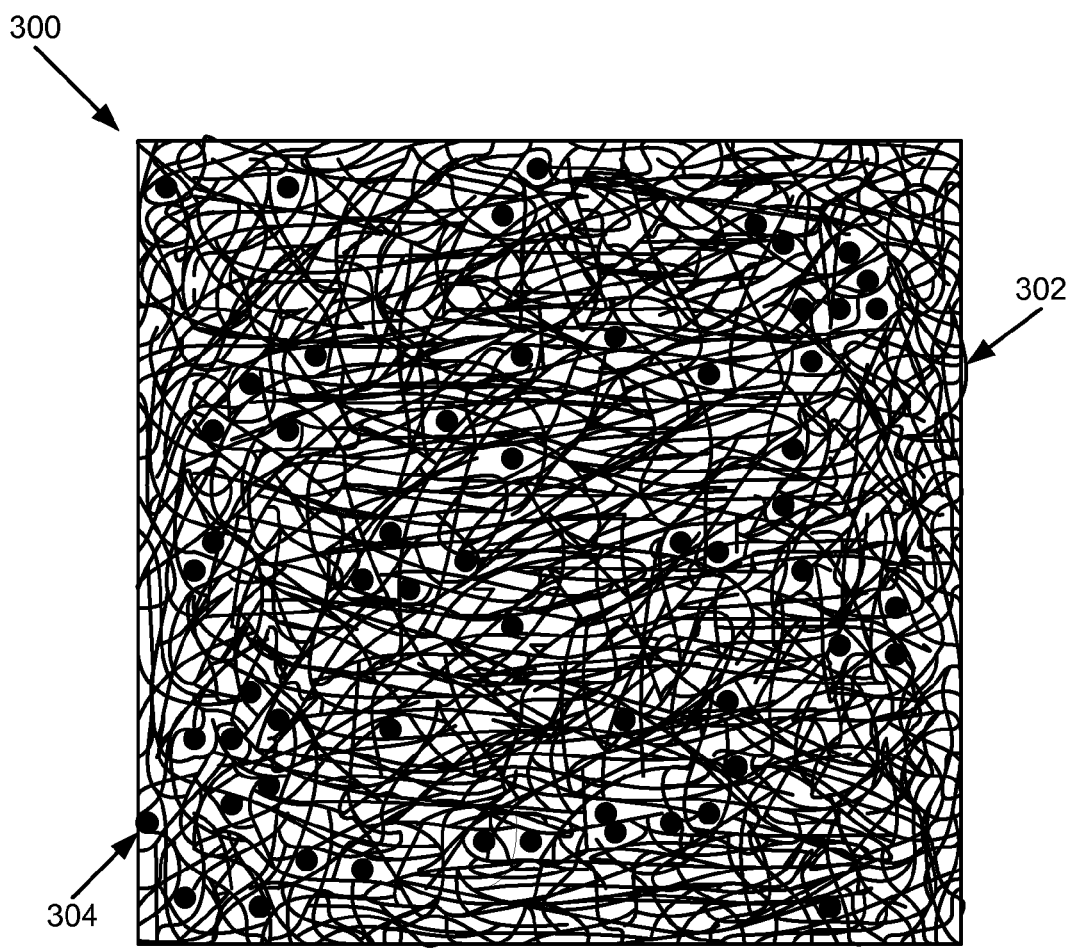
FIG. 3 is a general diagram of a particular embodiment of a layer of non-woven reflector fabric.

FIG. 3 illustrates a top view of a portion of a layer of non-woven reflector fabric 300. The fabric 300 includes a plurality of fibers 302 that are pressed or otherwise bound together to form a felt. Each of the fibers 302 comprises an inorganic material, such as a ceramic material. For example, the fibers can each comprise a refractory oxide, nitride or carbide material. In one embodiment, the fibers include a plurality of alumina fibers, a plurality of silica fibers, a plurality of borosilicate fibers, or any combination thereof. In an illustrative embodiment, the plurality of alumina fibers can include sapphire fibers, and the plurality of silica fibers can include quartz fibers.

In the embodiment shown in FIG. 3, the fabric 300 includes a plurality of particles 304 disposed in pores between its fibers 302. Each of the particles 304 comprises a more reflective material than that of the fibers 302. The particles 304 can comprise a reflective polymeric material. For example, the particles 304 can comprise a fluoropolymer material, such as polytetrafluoroethylene (PTFE).

The fibers 302 are characterized by an average fiber diameter of less than approximately 30 µm, preferably from approximately 0.5 µm to approximately 20 µm. Most preferably, the fibers 202, 204 are characterized by an average fiber diameter of approximately 1 µm to approximately 15 µm, such as from approximately 5 µm to approximately 10 µm. The particles 304 are preferably characterized by a particle size of from approximately 0.1 µm to approximately 20 µm, or more preferably, a particle size of from approximately 1 µm to approximately 10 µm. Most preferably, the particles 304 are characterized by a particle size of from approximately 1 µm to approximately 5 µm.

While FIG. 3 illustrates a single layer of non-woven reflector fabric, a reflector, such as the reflector 109 illustrated in FIG. 1, can include multiple layers of non-woven fabric. A total thickness of the layer(s) of fabric can range from 0.1 mm to 10 mm, and is preferably from approximately 0.2 mm to approximately 5 mm. More preferably, the total thickness is from approximately 1 mm to approximately 4 mm.

Figure 4A:
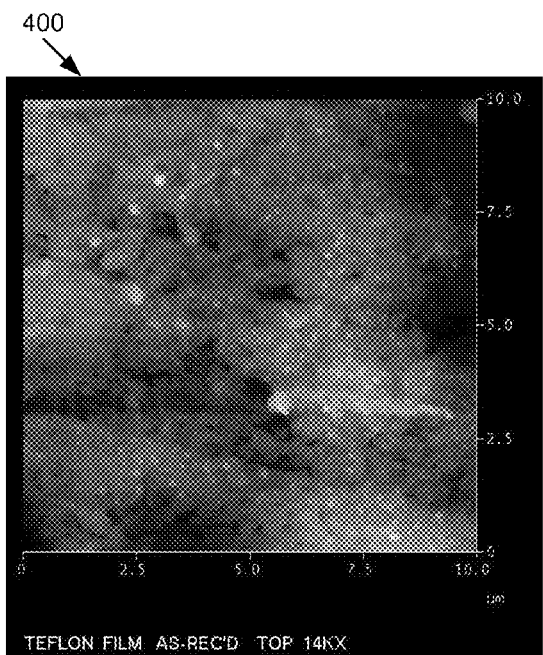
FIG. 4A is a photograph of a portion of reflective PTFE film at a magnification of 14,000 times.
Figure 4B:
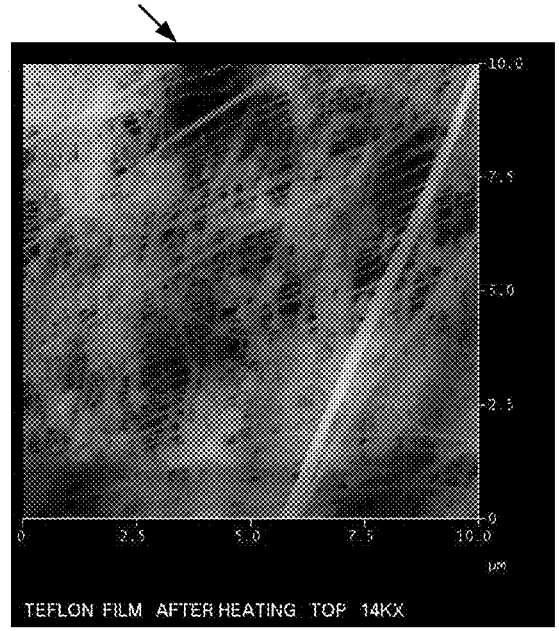
FIG. 4B is a photograph of the PTFE film reflector material shown in FIG. 4A, after heating to greater than 200° C.
Figure 5A:
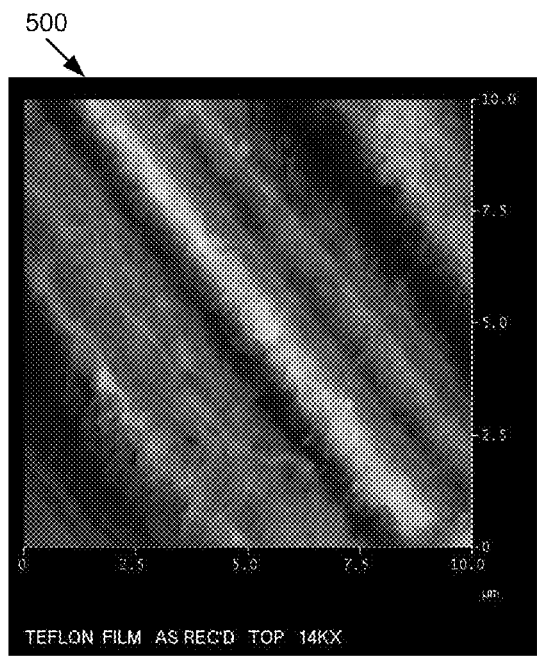
FIG. 5A is a photograph of a second portion of reflective PTFE film at a magnification of 14,000 times.
Figure 5B:
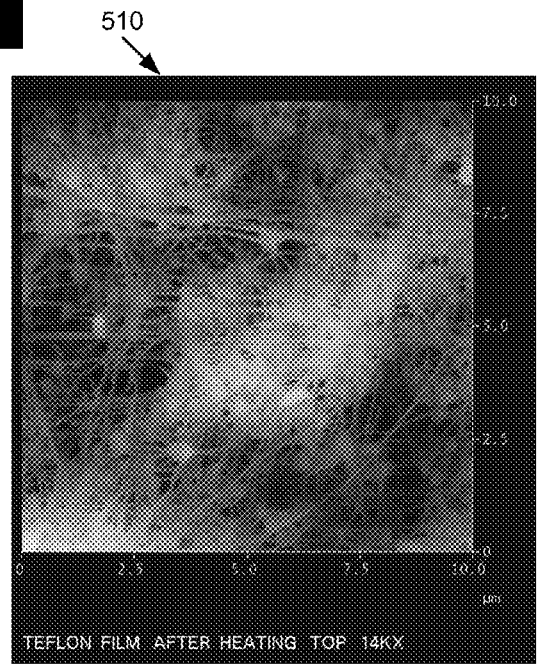
FIG. 5B is a photograph of the second PTFE film reflector material shown in FIG. 5A, after heating to a temperature greater than 200° C.

The concepts associated with the embodiments described above are particularly applicable to radiation detector devices having scintillators that include reflectors primarily composed of PTFE. In particular, the inventors have found based on empirical studies that the reflective properties of PTFE degrade at temperatures exceeding 200° C. Such temperatures are encountered in well logging procedures, for example. FIG. 4A is a photograph showing a portion of reflective PTFE film under 14,000× magnification, prior to heating. FIG. 4B is a photograph showing the same portion PTFE film after heating beyond 200° C. Similarly, FIG. 5A is a photograph showing a second portion of reflective PTFE film under 14,000× magnification, prior to heating. FIG. 5B is a photograph showing the second portion of PTFE film after heating beyond 200° C.

FIGS. 4A-5B illustrate that pores in PTFE films expand significantly upon heating to temperatures greater than 200° C. The greater porosity and lower cohesiveness of the heated PTFE diminishes the ability of the PTFE to reflect light, as gaps in the PTFE film allow some light to pass through. The embodiments described in the present disclosure provide reflective fabrics of alumina, silica, or combinations thereof, which maintain their reflective properties at temperatures greater than 200° C. For example, sapphire fibers, quartz fibers, or combinations thereof, can be combined in woven or non-woven cloths that are used as scintillator reflectors. In some embodiments, the reflective properties of such fabrics can be enhanced by disposing PTFE particles between fibers.

TABLE 1A, below, shows average photopeak pulse heights associated with electrical pulses output by a photosensor, in response to receiving photons from LYSO scintillator crystals (cerium activated $Lu_{1.8}Y_{0.2}SiO_5$) having reflectors of various materials prior to reflector heating. The LYSO scintillator crystals were cubes of 1×1×1 cm³ dimension with the reflector was wrapped on five faces. Tests were conducted at 800 Volts with a post-PMT gain of approximately 6.4. Greater average pulse height indicates that fewer photons emitted by a scintillator crystal are lost before reaching the photosensor. Average pulse heights for scintillator crystals wrapped in each material are compared with an average pulse height for a LYSO standard scintillator crystal that is used to calibrate equipment that counts emitted photons based on electrical pulse height. The standard pulse height emitted from the LYSO standard scintillator used for testing is 1029 channels (corresponding to the photopeak from a 662 keV gamma ray source). The table shows a percentage of the standard pulse height achieved with each reflective material.

TABLE 1A

Pulse Heights for Reflector Types Prior to Heating

| Reflector Type | Pulse Height | % of Standard Pulse Height |
| --- | --- | --- |
| PTFE | 802 | 77.9 |
| Sapphire felt (0.1 in.) | 584 | 56.8 |
| 3-Layer Sapphire Fiber Weave (0.045 in.) | 517 | 50.2 |
| 2-Layer Sapphire Fiber Weave (0.030 in.) | 505 | 49.1 |
| 1-Layer Sapphire Fiber Weave (0.015 in.) | 494 | 48.0 |

TABLE 1B, below, shows average pulse heights associated with electrical pulses output by a photosensor, in response to receiving photons from scintillators having reflectors of various materials after reflector heating to 250° C. over 24 hours. Average pulse heights for scintillator crystals wrapped in each material are compared with the standard pulse height for the LYSO standard scintillator crystal.

TABLE 1B

Pulse Heights for Reflector Types After Heating to 250° C. for 24 hrs.

| Reflector Type | Pulse Height | % of Standard Pulse Height |
| --- | --- | --- |
| PTFE (tetratec) | 702 | 68.2879 |
| Sapphire felt (0.1 in.) | 579 | 56.3230 |
| 3-Layer Sapphire Fiber Weave (0.045 in.) | 518 | 50.3891 |
| 2-Layer Sapphire Fiber Weave (0.030 in.) | 501 | 48.7354 |
| 1-Layer Sapphire Fiber Weave (0.015 in.) | 496 | 48.2490 |

TABLE 1A and TABLE 1B illustrate advantages of various embodiments of alumina fabrics described above. Average pulse height associated with PTFE reflective film degraded by approximately 12.5% after heating to 250° C. for 24 hours. Whereas, average pulse heights associated with the various alumina fabrics changed by less than approximately 1.0% after heating to 250° C. for 24 hours.

The illustrations of the embodiments described herein are intended to provide a general understanding of the structure of the various embodiments. The illustrations are not intended to serve as a complete description of all of the elements and features of the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A radiation detector device, comprising:
   a photosensor; and
   a scintillator coupled to the photosensor, the scintillator including:
      a scintillator crystal having a first end proximal to the photosensor, a second end distal from the photosensor, and a length extending between the proximal end and the distal end; and
      a reflector fabric adapted to reflect scintillation light emitted by the scintillator crystal, the reflector substantially surrounding the scintillator crystal at least along its length, wherein the reflector fabric includes a plurality of fibers, each fiber comprising an inorganic material.

2. The radiation detector device of claim 1, wherein each of the plurality of fibers comprises a ceramic material.

3. The radiation detector device of claim 2, wherein each of the plurality of fibers comprises a refractory material.

4. The radiation detector device of claim 3, wherein each of the plurality of fibers comprises a refractory oxide material, a refractory non-oxide material, or a refractory composite material.

5. The radiation detector device of claim 4, wherein each of the plurality of fibers comprises alumina, silica, borosilicate or any combination thereof.

6. The radiation detector device of claim 5, wherein each of the plurality of fibers comprises sapphire, quartz, or a combination thereof.

7. The radiation detector device of claim 1, wherein the reflector fabric includes a plurality of particles of a material having a greater reflectivity than the fibers, and wherein the particles are disposed in gaps between the fibers.

8. The radiation detector device of claim 7, wherein the material includes a polymer.

9. The radiation detector device of claim 8, wherein the material includes polytetrafluoroethylene (PTFE).

10. The radiation detector device of claim 7, wherein each of the plurality of particles is characterized by a diameter of from approximately 0.1 μm to approximately 20 μm.

11. A scintillator, comprising:
a scintillator crystal, the scintillator crystal having a length extending between a proximal end and a distal end; and
a reflector fabric adapted to reflect scintillation light emitted by the scintillator crystal, the reflector fabric substantially surrounding the scintillator crystal at least along its length, wherein the reflector fabric includes a plurality of fibers, each fiber comprising an inorganic material.

12. The scintillator of claim 11, wherein each of the plurality of fibers comprises alumina, silica, borosilicate or any combination thereof.

13. The scintillator of claim 12, wherein each of the plurality of fibers comprises sapphire, quartz, or a combination thereof.

14. The scintillator of claim 11, wherein the reflector fabric comprises at least one layer of woven fabric, at least one layer of non-woven fabric, or a combination thereof.

15. The scintillator of claim 11, wherein the reflector fabric is characterized by a total thickness of from approximately 0.1 mm to approximately 10 mm.

16. The scintillator of claim 11, wherein the plurality of fibers are characterized by an average diameter of less than 30 μm.

\* \* \* \* \*